United States Patent
Cheung et al.

(10) Patent No.: US 10,812,616 B2
(45) Date of Patent: Oct. 20, 2020

(54) TRANSFERRING AN EXCHANGE OF CONTENT TO A RECEIVING CLIENT DEVICE FROM A CLIENT DEVICE AUTHORIZED TO TRANSFER A CONTENT EXCHANGE TO THE RECEIVING CLIENT DEVICE

(71) Applicant: Facebook, Inc., Menlo Park, CA (US)

(72) Inventors: Vincent Charles Cheung, San Carlos, CA (US); Connie Yeewei Ho, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 153 days.

(21) Appl. No.: 15/855,284

(22) Filed: Dec. 27, 2017

(65) Prior Publication Data
US 2019/0199820 A1    Jun. 27, 2019

(51) Int. Cl.
*G06F 15/16* (2006.01)
*H04L 29/08* (2006.01)
*H04L 29/06* (2006.01)

(52) U.S. Cl.
CPC ........ *H04L 67/306* (2013.01); *H04L 63/0876* (2013.01); *H04L 67/06* (2013.01)

(58) Field of Classification Search
CPC .... H04L 63/0876; H04L 67/06; H04L 67/306
See application file for complete search history.

(56) References Cited

U.S. PATENT DOCUMENTS

| | | | |
|---|---|---|---|
| 7,080,124 B1 * | 7/2006 | Shankar | G11B 27/322 709/206 |
| 7,502,795 B1 * | 3/2009 | Svendsen | G06K 9/00677 |
| 7,725,398 B2 * | 5/2010 | Dawson | G06Q 30/06 705/54 |
| 7,734,690 B2 * | 6/2010 | Moromisato | G06Q 10/10 709/204 |
| 7,769,996 B2 * | 8/2010 | Randle | G06Q 20/027 370/351 |
| 7,886,010 B1 * | 2/2011 | Shankar | G11B 27/322 709/206 |
| 7,966,565 B2 * | 6/2011 | Dawson | H04N 1/00244 709/205 |
| 9,031,581 B1 * | 5/2015 | Haney | H04W 4/02 455/456.3 |

(Continued)

*Primary Examiner* — Moustafa M Meky
*Assistant Examiner* — Thorne E Waugh
(74) *Attorney, Agent, or Firm* — Fenwick & West LLP

(57) ABSTRACT

Various client devices include displays and one or more image capture devices configured to capture video data. If a user is exchanging content with another user via a client device and is subsequently identified by a receiving client device via image data captured by an image capture device of the receiving client device, the client device transfers the exchanged content with the other user to the receiving client device. The receiving client device includes information identifying one or more other client devices authorized to transfer exchanged content to the receiving client device when the receiving client device receives a request from the client device. If multiple other client devices are within a threshold distance of the receiving client device, the other client devices transfer exchanged content to the receiving client device, which combines the content from different other client devices.

18 Claims, 3 Drawing Sheets

(56) References Cited

U.S. PATENT DOCUMENTS

| | | | | |
|---|---|---|---|---|
| 9,043,474 B2* | 5/2015 | Schleifer | ............. | H04L 12/1818 |
| | | | | 709/227 |
| 9,098,832 B1* | 8/2015 | Scardino | .............. | G06Q 10/107 |
| 9,350,944 B2* | 5/2016 | Lee | .................... | G06K 9/00288 |
| 10,271,079 B1* | 4/2019 | Woschank | ....... | H04N 21/25816 |
| 2012/0105632 A1* | 5/2012 | Renkis | ............. | G08B 13/19619 |
| | | | | 348/143 |
| 2014/0055553 A1* | 2/2014 | Lee | .................... | G06K 9/00979 |
| | | | | 348/14.07 |

* cited by examiner

TRANSFERRING AN EXCHANGE OF CONTENT TO A RECEIVING CLIENT DEVICE FROM A CLIENT DEVICE AUTHORIZED TO TRANSFER A CONTENT EXCHANGE TO THE RECEIVING CLIENT DEVICE

BACKGROUND

This disclosure relates generally to capturing video data, and more specifically to transferring exchange of content between different client devices when a receiving client device includes information identifying client devices authorized to transfer content exchanges to the receiving client device.

Increasingly, client devices, online systems, and networks allow users to exchange larger amounts of content with each other. For example, an online system allows its users to exchange video data captured by different users via client devices associated with the user. In a specific example, an online system may establish video messaging between a user and an additional user, allowing the users to exchange video data captured by their respective client devices in real-time or in near real-time.

However, users often use multiple client devices to retrieve content, to provide content, and to exchange content with other users. However, conventional client devices do not easily exchange video data or other data with each other unless users provide specific interactions to different client devices for the client devices to exchange data. For example, a user in a video call using a conventional client device cannot transfer the video call to another client device without providing multiple inputs to the different client devices or without ending the video call from the client device and reestablishing a new video call from the other client device. Limiting exchange of content between client devices makes it more difficult for a user to easily transfer an established exchange of content with other devices to another client device that may be better configured for the exchange of content, impairing overall user interaction with the client devices.

SUMMARY

Various client devices associated with users of an online system include one or more image capture devices. An image capture device included in a client device is configured to capture video data of a local area surrounding the client device. In various embodiments, a receiving client device includes an image capture device configured to capture video data or image data of a local area surrounding the receiving client device, while a sending client device also includes an image capture device configured to captured video data or image data of a local area surrounding the sending client device.

Additionally, the receiving client device obtains information identifying one or more client devices authorized to transfer video data to the receiving client device. For example, the receiving client device receives device identifiers associated with one or more client devices authorized to exchange video data, or other content, with the receiving client device. A device identifier of a client device uniquely identifies the client device, and may be an alphanumeric string associated with the client device. In various embodiments, a user provides information identifying one or more other client devices authorized to exchange video data with the receiving client device to the receiving client device, which locally stores the information identifying the one or more other client device. Alternatively, the receiving client device communicates with the online system and transmits the information identifying the one or more other client devices to the online system, which stores the information identifying the one or more other client devices in association with the receiving client device.

The receiving client device receives a request from an additional client device associated with a user of the online system to transfer an exchange of video data with another user of the online system from the additional client device to the receiving client device. The request includes information identifying the additional client device, such as a device identifier of the additional client device or any other suitable information uniquely identifying the additional client device. In various embodiments, a user of the additional client device provides a specific input (e.g., an audio command captured by the receiving client device, a gesture received by the receiving client device, selection of a particular element presented by the additional client device, a particular movement of the additional client device relative to a reference position, etc.) to the additional client device, and the additional client device transmits the request to the receiving client device in response to receiving the specific input. Alternatively, a user associated with the additional client device provides an input to the receiving client device (e.g., accesses an element presented on a display device of the receiving client device, provides an audio signal captured by the receiving client devices, performs a specific movement captured by the image capture device of the receiving client device, etc.), and the receiving client device transmits a message to the additional client device, which transmits the request to the receiving client device in response to receiving the message. This allows the receiving client device to obtain information identifying the additional client device in response to receiving an input from the user.

The receiving client device determines whether the information identifying the additional client device included in the received request matches obtained information identifying at least one client device authorized to transfer video data, or other content, to the receiving client device. If the receiving client device determines the information identifying the additional client device does not match obtained information identifying at least one client device authorized to transfer video data to the receiving client device, the receiving client device does not perform additional actions. However, if the receiving client device determines the information identifying the additional client device included in the received request matches obtained information identifying a client device authorized to transfer video data to the receiving client device, the receiving client device obtains information from the client device to exchange video data with the other user. For example, the receiving client device obtains information identifying the other user or identifying a client device associated with the other user with which the additional client device was exchanging video data. However, the receiving client device may obtain any suitable information from the additional client device to identify the other user with whom the additional client device was exchanging video data.

Using the obtained information identifying the other user or identifying the client device associated with the other user, the receiving client device establishes a connection with the online system and provides information identifying the other user with whom the additional client device was exchanging video data. In some embodiments, the receiving client device obtains a session identifier assigned by the online system to the exchange of video data with the other user from the additional client device, the receiving client device provides the session identifier to the online system, which uses the session identifier to identify the other user and another client device associated with the other user. Subsequently, the receiving client device exchanges video data with the other user by via the established connection with the online system. For example, video data provided by the other user is transmitted from the online system to the receiving client device via the established connection and presented by the display device of the receiving client device. Similarly, video data captured by the image capture device of the receiving client device is transmitted to the online system via the established channel, and the online system transmits the video data to another client device for presentation to the other user. In some embodiments, the user associated with the additional client device provides a setting to the receiving client device specifying whether video data captured by the additional client device or video data captured by the image capture device of the receiving client device is transmitted from the receiving client device to the online system. In other embodiments, the receiving client device selects one of video data captured by the image capture device of the receiving client device or video data captured by the additional client device based on any suitable criteria) and transmits the selected video data to the online system via the established channel.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
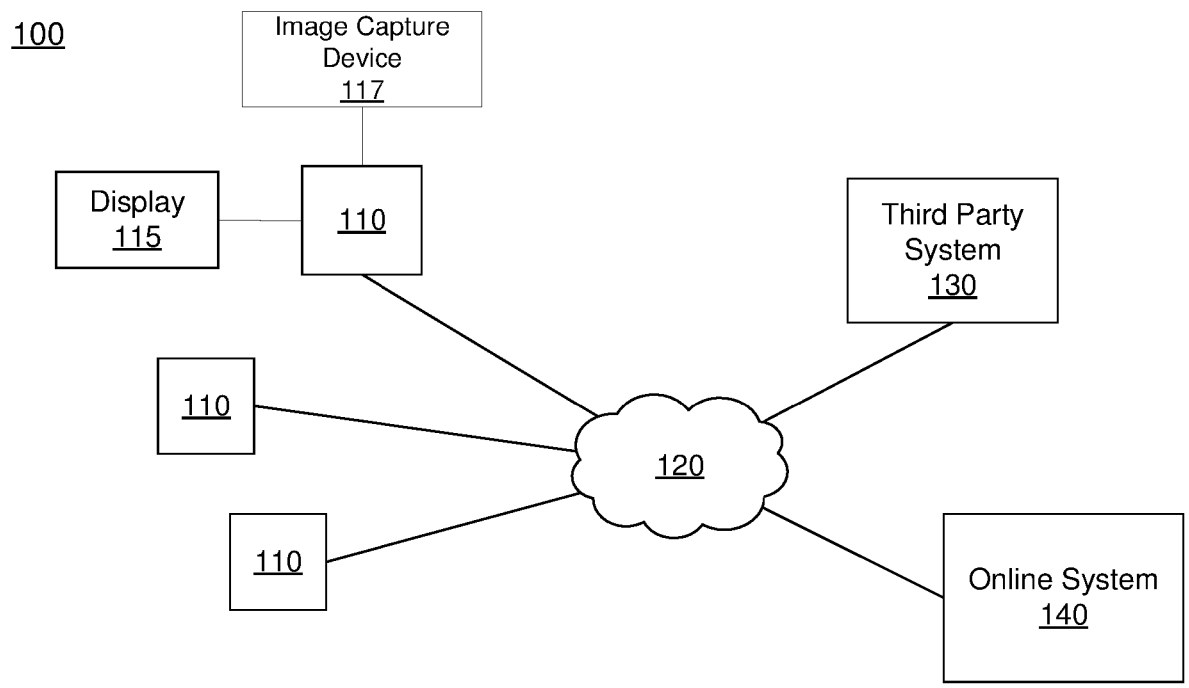
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. As further described below in conjunction with FIG. 2, a client device 110 includes a display device 115 configured to present content, and one or more image capture devices configured to capture image or video data of a local area surrounding the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
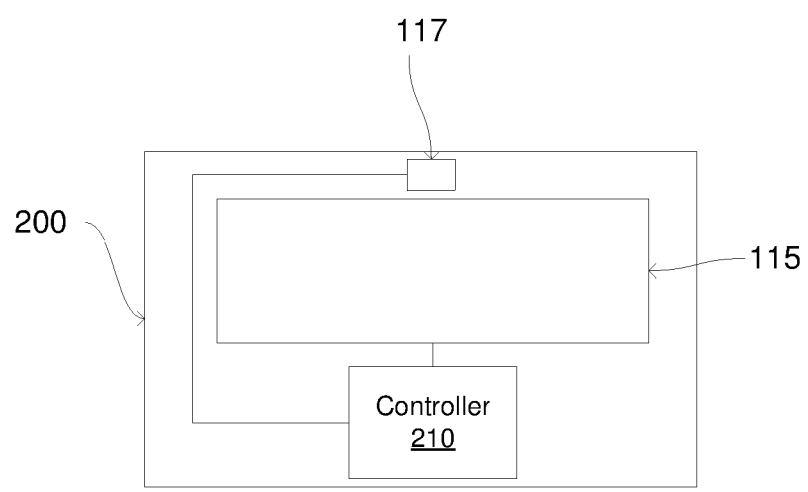
FIG. 2 is a block diagram of a client device, in accordance with an embodiment.

FIG. 2 is a block diagram of an embodiment of a client device 117. In the embodiment shown in FIG. 2, the client device 110 includes a display device 115 and an image capture device 117, as well as a controller 210. However, in other embodiments, the client device 110 includes different or additional components than those shown in FIG. 2.

The display device 115 may be integrated into the client device 110 or coupled to the client device 110. For example, a display device 115 integrated into a client device 110 is a display screen included in the client device 110. Alternatively, the display device 115 is a monitor or other display coupled to the client device 110. The display device 115 presents image data or video data to a user. Image or video data presented by the display device 115 is determined by an application executing on the client device 110. Different applications may be included on the client device 110, so execution of different applications changes the content presented by the user by the display device 115.

The image capture device 117 captures video data or images of a local area surrounding the client device 110 and within a field of view of the image capture device 117. In some embodiments, the image capture device 117 includes one or more cameras, one or more video cameras, or any other device capable of capturing image data or video data. Additionally, the image capture device 117 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 117. Hence, modifying one or more parameters of the image capture device 117 modifies video data or image data captured by the image capture device 117 after modification of the one or more parameters. While FIG. 2 shows a single image capture device 117 included in the client device 110, in other embodiments, the client device 110 includes any suitable number of image capture devices 117.

The controller 210 is coupled to the image capture device 117 and comprises a storage device coupled to a processor. In various embodiments, the controller 210 is also coupled to the display device 115. The controller 210 includes instructions that, when executed by the processor, apply one or more models to video data captured by the image capture device 117. As further described below in conjunction with FIG. 4, the controller 210 may include information identifying various other client devices 110 that are authorized to transfer an exchange of video data, or other data, with the client device 110. If the client device 110 receives a request including information identifying another client device 110, the client device 110 determines whether the other client device 110 is authorized to transfer an exchange of video data or other data with the client device 110. As further described below in conjunction with FIG. 4, if the other client device 110 authorized to exchange a transfer of video data or other data with the client device 110, the client device 110 obtains information from the other client device 110 and establishes a connection with the online system 140 to exchange the video data or other data exchanged by the other client device 110.

In various embodiments, the client device 110 includes one or more audio capture devices, such as microphones. For example, the client device 110 includes an array of microphones configured for beamforming in two or three dimensions. The audio capture devices capture audio signals from different regions within a local area surrounding the client device 110. In various embodiments, the one or more audio capture devices are coupled to the controller 210, which maintains information identifying different regions of the local area surrounding the client device 110; for example, the controller 210 identifies 24 fifteen degree regions of the local area surrounding the client device 110 originating from a point within the client device 110, identifying regions of a 360 degree local area surrounding the client device 110.

The one or more audio capture devices are coupled to the controller 210, which applies one or more models, such as machine learned models or other sound recognition models, to audio data captured from a region of the local area surrounding the client device 110. The controller 210 includes information identifying users or objects (e.g., a television, a mobile device), and application of the one or more models to audio captured from a region of the local area surrounding the client device 110 determines whether the captured audio data includes audio data from a user or an object identified by the controller 210 or ambient noise. In some embodiments, the one or more models applied by the controller 210 determine a particular user or a particular object identified by the controller 210 from which the one or more audio capture devices captured audio in the region. In other embodiments, the client device 110 communicates audio data captured by one or more audio devices to the online system 140, which applies the one or more models to determine whether the audio data includes audio data captured from an identified object or user or to determine a particular identified user or object from which audio data was captured. The online system 140 provides the client device 110 with an indication of whether the captured audio data includes audio data captured from an identified object or user or provides information specifying a particular identified object or user from which the audio data was captured. The controller 210 or the online system 140 similarly determines whether audio captured from other regions surrounding the local area of the client device 110. Based on determinations of identified objects or users from which audio data in different regions was captured, the controller 210 modifies positioning of one or more audio devices to improve quality of audio captured from one or more regions. For example, the controller 210 repositions one or more audio capture devices to improve quality of audio captured from a region surrounding the local area from which audio data was captured from a specific user or from a specified object. Similarly, the controller 210 may reposition or otherwise modify one or more parameters of the image capture device 117 based on regions of the local area surrounding the client device 110 from which audio data was captured from different users or objects. The one or more audio devices and the image capture device 117 may be directed to different portions of the local area surrounding the client device 110 in various embodiments. For example, the image capture device 117 is directed to an object described by a user, while the controller 210 directs one or more audio capture devices to a region of the local area surrounding the client device 110 from which audio data was captured by a specific user.

Additionally, the controller 210 maintains and enforces one or more privacy settings for users or people identified from captured video data or other data in various embodiments. A privacy setting of a user or person determines how particular information associated with a user or person can be shared, and may be stored in association with information identifying the user or the person. In some embodiments, the controller 210 retrieves privacy settings for one or more users maintained by the online system 140. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include image data including the user or the person, audio data including audio captured from the user or the person, video data including the user or the person, and the like.

In various embodiments, the controller 210 does not identify a user within captured video data, audio data, image data, or other data unless the controller 210 obtains a privacy setting from the user authorizing the controller 210 to identify the user. For example, a privacy setting associated with a user has a default setting preventing the controller 210 from identifying the user, so the controller 210 does not identify the user unless the user manually alters the privacy setting to allow the controller 210 to identify the user. Additionally, an alternative privacy setting regulates transmission of information from the client device 110 identifying the user to another entity (e.g., another client device 110, the online system 140, a third party system 130) in various embodiments. The alternative privacy setting has a default setting preventing transmission of information identifying the user in various embodiments, preventing the controller 210 from transmitting information identifying the user to other entities unless the user manually modifies the alternative privacy setting to authorize transmission). The controller 210 maintains the one or more privacy settings for each user identified from captured video data or other data, allowing user-specific control of transmission and identification of each user. In some embodiments, the controller 210 prompts a person to provide privacy settings when the controller 210 initially identifies the person from captured data and stores the provided privacy settings in association with information identifying the person.

In some embodiments, the controller 210 obtains information maintained by the online system 140 or from one or more third party systems 130 for a user identified from captured video data, subject to privacy settings for the user. Based on video data, audio data, image data, or other data including the user previously captured by the client device 110 and the obtained information, the controller 210 may generate content for presentation to the user via the client device 110. For example, the controller 210 overlays content items from the online system 140 associated with one or more objects identified by the controller 210 from video data or image data captured by the client device 110. Alternatively, the online system 140 generates content for the user based on video data, image data, audio data, or other data including the user received from the client device 110 and information maintained by the online system 140 for the user (or obtained from one or more third party systems 130 by the online system 140) and provides the generated content to the client device 110 for presentation to the user.

Figure 3:
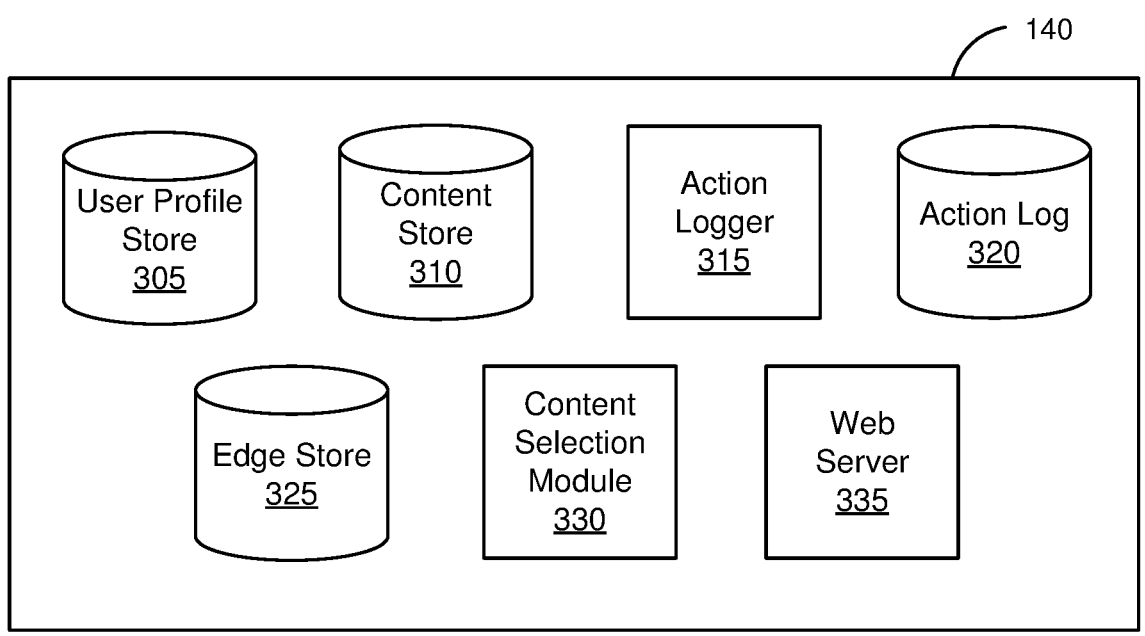
FIG. 3 is a block diagram of an online system, in accordance with an embodiment.

FIG. 3 is a block diagram of an architecture of the online system 140. The online system 140 shown in FIG. 3 includes a user profile store 305, a content store 310, an action logger 315, an action log 320, an edge store 325, a content selection module 330, and a web server 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

In some embodiments, a user profile associated with a user includes information identifying one or more other users authorized to exchange information with a client device 110 associated with the user. For example, a user profile includes usernames, user identifiers, or other information uniquely identifying other users authorized to exchange video data with a client device associated with the user, allowing the user profile to individually identify other users who are authorized to exchange video data with the client device associated with the user. Additional information may be associated with information identifying a user authorized to exchange video data with the client device 110 associated with the user in various embodiments. For example, a time interval is associated with information identifying an additional user authorized to exchange video data with the client device 110 associated with the user to limit the additional user's authorization to exchange video data with the client device 110 associated with the user to the time interval. As another example, a connection with the user associated with the client device 110 via the online system 140 is associated with information identifying an additional user authorized to exchange video data with the receiving client device 110 to indicate the additional user is authorized to exchange video data with the client device 110 associated with the user while the user is connected to the additional user via the online system 140. In another example, an action is associated with information identifying an additional user authorized to exchange video data with the client device 110 associated with the user to indicate that the additional user is authorized to exchange video data with the client device 110 associated with the user if the online system 140 maintains information indicating the additional user has performed the action. However, any suitable criteria may be associated with information identifying an additional user authorized to exchange video data with a client device 110 associated with the user, limiting the additional user's authorization to exchange video data with the client device associated with the user unless characteristics associated with the additional user satisfy at least a threshold amount of the criteria.

Alternatively or additionally, information identifying one or more additional users of the online system 140 who are authorized to exchange video data with the client device 110 associated with the user comprises one or more rules, with each rule specifying one or more criteria. When at least a threshold amount of criteria specified by a rule are satisfied by characteristics of an additional user of the online system 140 maintained by the online system 140, the additional user is authorized to exchange video data with the client device 110 associated with the user. This allows additional users of the online system 140 having particular characteristics to be authorized to exchange video data with the client device 110 associated with the user. Example criteria specified by a rule include: a connection to the user maintained by the online system 140, a connection to an object maintained by the online system 140, an action stored by the online system 140 in association with the additional user authorized to exchange video data with the client device 110 associated with the user, and a connection to a specific user of the online system 140. However, any suitable criteria may be specified by one or more rules to identify additional users who are authorized to exchange video data with the client device 110 associated with the user.

Additionally, a user profile may include information identifying one or more client devices 110 authorized to transfer an exchange of video data or other content with another user to a receiving client device 110 associated with the user, as further described below in conjunction with FIG. 4. For example, the user profile of a user includes a device identifier (or other identifying information) of a receiving client device 110 and information identifying one or more other client devices 110 (e.g., device identifiers of other client devices) that are authorized to transfer an exchange of video data, or other content, from the other client devices 110 to the receiving client device 110. Additionally, the user profile may include one or more privacy settings associated with an identified other client device 110 specifying criteria to be satisfied for the identified other client device 110 to transfer an exchange of video data from the identified other client device 110 to the receiving client device 110. For example, the user profile includes information indicating that a client device 110 is authorized to transfer an exchange of video data form the client device 110 to the receiving client device 110 when a user who is authorized to exchange video data via the receiving client device 110 is identified in video data captured by the receiving client device 110.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 315 receives communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

The action log 320 may be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The content selection module 330 selects one or more content items for communication to a client device 110 to be presented to a user. Content items eligible for presentation to the user are retrieved from the content store 310 or from another source by the content selection module 330, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 330 includes content items eligible for presentation to the user in one or more selection processes, which identify a set of content items for presentation to the user. For example, the content selection module 330 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 330 selects content items for presentation to the user. As an additional example, the content selection module 330 selects content items having the highest measures of relevance or having at least a threshold measure of relevance for presentation to the user. Alternatively, the content selection module 330 ranks content items based on their associated measures of relevance and selects content items having the highest positions in the ranking or having at least a threshold position in the ranking for presentation to the user.

Content items eligible for presentation to the user may include content items associated with bid amounts. The content selection module 330 uses the bid amounts associated with content items when selecting content for presentation to the user. In various embodiments, the content selection module 330 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 330 may rank content items based on their associated bid amounts and select content items having at least a threshold position in the ranking for presentation to the user. In some embodiments, the content selection module 330 ranks both content items not associated with bid amounts and content items associated with bid amounts in a unified ranking based on bid amounts and measures of relevance associated with content items. Based on the unified ranking, the content selection module 330 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 330 receives a request to present a feed of content to a user of the online system 140. The feed includes content items such as stories describing actions associated with other online system users connected to the user. The content selection module 330 accesses one or more of the user profile store 305, the content store 310, the action log 320, and the edge store 325 to retrieve information about the user. For example, information describing actions associated with other users connected to the user or other data associated with users connected to the user are retrieved. Content items from the content store 310 are retrieved and analyzed by the content selection module 330 to identify candidate content items eligible for presentation to the user. For example, content items associated with users who not connected to the user or stories associated with users for whom the user has less than a threshold affinity are discarded as candidate content items. Based on various criteria, the content selection module 330 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 330 presents content to a user through a feed including a plurality of content items selected for presentation to the user. The content selection module 330 may also determine the order in which selected content items are presented via the feed. For example, the content selection module 330 orders content items in the feed based on likelihoods of the user interacting with various content items.

The content selection module 330 receives video data captured by an image capture device 117 included in a client device 110 associated with a sending user of the online system and transmits the video data to a receiving client device 110 for presentation to a receiving user via a display device 115. The content selection module may receive a request from the client device 110 that identifies the receiving user, and subsequently transmits a request to the receiving client device 110 to establish a connection with the online system 140 for receiving data from the sending client device 110.

The content selection module 330 enforces one or more privacy settings of the users of the online system 140 in various embodiments. A privacy setting of a user determines how particular information associated with a user can be shared, and may be stored in the user profile of a user in the user profile store 305. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections video data including the user, actions taken by the user such as adding a connection, changing user profile information and the like. In various embodiments, the online system 140 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 330 includes logic to determine if certain information associated with a user can be accessed by other users connected to the user via the online system 140, third-party system 130 and/or other applications and entities. Based on the user's privacy settings, the content selection module 330 determines if another user, a third-party system 130, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

The web server 335 links the online system 140 via the network 120 to the one or more client devices 110, as well as to the one or more third party systems 130. The web server 335 serves web pages, as well as other content, such as JAVA®, FLASH®, XML and so forth. The web server 335 may receive and route messages between the online system 140 and the client device 110, for example, instant messages, queued messages (e.g., email), text messages, short message service (SMS) messages, or messages sent using any other suitable messaging technique. A user may send a request to the web server 335 to upload information (e.g., images or videos) that are stored in the content store 310. Additionally, the web server 335 may provide application programming interface (API) functionality to send data directly to native client device operating systems, such as IOS®, ANDROID™, or BlackberryOS.

Exchanging Video Data Between Client Devices

Figure 4:
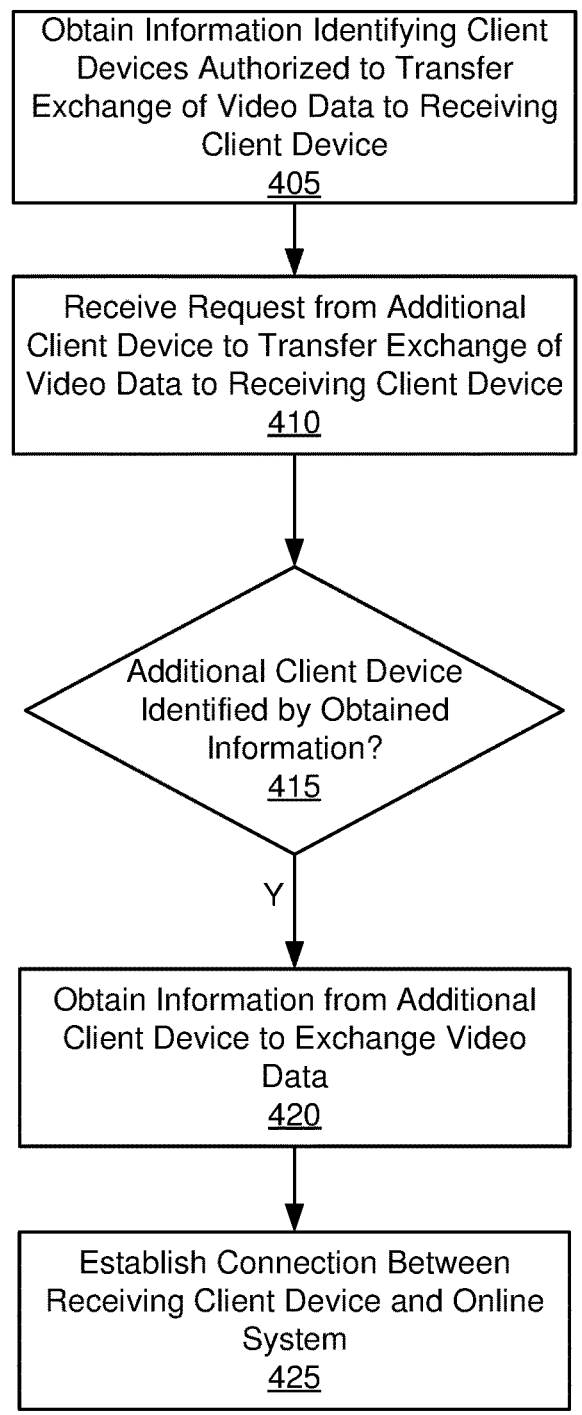
FIG. 4 is a flowchart of a method for exchanging content between a receiving client device and an additional client device, in accordance with an embodiment.

FIG. 4 is a flowchart of one embodiment of a method for exchanging content between a receiving client device 110 and an additional client device 110. In various embodiments, the steps described in conjunction with FIG. 4 may be performed in different orders. Additionally, in some embodiments, the method may include different and/or additional steps than those shown in FIG. 4.

A receiving client device 110 includes an image capture device 117, as further described above in conjunction with FIGS. 1 and 2. Additionally, the receiving client device 110 obtains 405 information identifying one or more client devices 110 authorized to transfer video data to the receiving client device 110. For example, the receiving client device 110 receives device identifiers associated with one or more client devices 110 authorized to exchange video data, or other content, with the receiving client device. A device identifier of a client device 110 uniquely identifies the client device 110, and may be an alphanumeric string associated with the client device 110. In various embodiments, a user provides information identifying one or more other client devices 110 authorized to exchange video data with the receiving client device 110 to the receiving client device 110, which locally stores the information identifying the one or more other client device 110. Alternatively, the receiving client device 110 communicates with the online system 140 and transmits the information identifying the one or more other client devices 110 to the online system 140, which stores the information identifying the one or more other client devices 110 in association with the receiving client device 110.

In other embodiments, the receiving client device 110 obtains information identifying a user of the online system 140 who is authorized to exchange video data with the receiving client device 110 and obtains information associated with the identified user that includes information identifying one or more client devices 110 associated with the identified user. Information identifying client devices 110 associated with the identified user specifies one or more client devices 110 authorized to exchange video data with the receiving client device 110. For example, the receiving client device 110 identifies the user of the online system 140 from video data or image data of a local area surrounding the receiving client device 110 captured by the image capture device 117. Images captured by the image capture device 117 are communicated to a controller 210 included in the receiving client device 110 (or coupled to the receiving client device 110 in other embodiments). In various embodiments, the controller 210 applies one or more machine learned models to characteristics of the video captured by the image capture device 117 to locate people included in the captured video data. In various embodiments, the controller 210 applies one or more methods to locate people within the captured video data. The controller 210 may use any suitable model or combination of models to locate people within video data captured by the image capture device 117. Models applied by the controller 210 to captured video data may perform facial tracking (in two-dimensions or in three-dimensions), two-dimensional pose tracking, three-dimensional pose tracking, or any other suitable method to identify portions of a person's face or portions of the person's body From the captured video data, the receiving client device 110 determines whether a user of the online system 140 is included in the captured video data. For example, the receiving client device transmits the captured video data to the online system, which includes information identifying various users, as further described above. The online system 140 determines measures of similarity between people identified in the captured video data to information identifying various users using any suitable method or methods. If the online system 140 determines a person identified in the captured video data has at least a threshold measure of similarity to information identifying a user of the online system 140, the online system 140 provides an indication to the receiving client device 110 that the captured video data includes a user of the online system 140.

The receiving client device 110 or the online system 140 compares users of the online system 140 included in the captured video data to stored information identifying users authorized to exchange video data with the receiving client device 110. For example, the online system 140 stores information identifying users authorized to exchange video data with the receiving client device 110 in association with an identifier of the receiving client device 110 and compares information identifying users included in the captured video data from the online system 140 to the information identifying users authorized to exchange video data with the receiving client device 110. If information identifying a user included in the captured video data matches information identifying a user authorized to exchange video data with the client device 110, the online system 140 transmits information identifying one or more client devices 110 associated with the user to the receiving client device 110. The online system 140 transmits information identifying the one or more client devices 110 associated with the user to the receiving client device 110, so the information identifying the one or more client devices 110 associated with the user received from the online system 140 identify client devices 110 authorized to exchange video data with the receiving client device 110. Alternatively, the online system 140 provides information identifying users included in the captured video data to the receiving client device 110, which compares information identifying users included in the captured video data with locally stored data identifying users authorized to exchange content with the receiving client device 110. Responsive to determining information identifying a user included in the captured video data matches information identifying a user authorized to exchange content with the receiving client device 110, the receiving client device 110 retrieves information identifying client devices associated with the user included in the captured video data as information identifying one or more client devices 110 authorized to transfer video data to the receiving client device 110.

Subsequently, the receiving client device 110 receives 410 a request from an additional client device 110 associated with a user of the online system 140 to transfer an exchange of video data with another user of the online system 140 from the additional client device 110 to the receiving client device 110. The request includes information identifying the additional client device 110, such as a device identifier of the additional client device 110 or any other suitable information uniquely identifying the additional client device 110. In various embodiments, a user of the additional client device 110 provides a specific input (e.g., an audio command captured by the receiving client device 110, a gesture received by the receiving client device 110, selection of a particular element presented by the additional client device 110, a particular movement of the additional client device 110 relative to a reference position, etc.) to the additional client device 110, and the additional client device 110 transmits the request 410 to the receiving client device 110 in response to receiving the specific input. Alternatively, a user associated with the additional client device 110 provides an input to the receiving client device 110 (e.g., accesses an element presented on a display device 115 of the receiving client device 110, provides an audio signal captured by the receiving client devices 110, performs a specific movement captured by the image capture device 117 of the receiving client device 110, etc.), and the receiving client device 110 transmits a message to the additional client device 110, which transmits the request to the receiving client device 110 in response to receiving the message. This allows the receiving client device 110 to obtain information identifying the additional client device 110 in response to receiving an input from the user.

The receiving client device 110 determines 415 whether the information identifying the additional client device 110 included in the received request matches obtained information identifying at least one client device 110 authorized to transfer video data, or other content, to the receiving client device 110. If the receiving client device 110 determines 415 the information identifying the additional client device 110 does not match obtained information identifying at least one client device 110 authorized to transfer video data to the receiving client device 110, the receiving client device 110 does not perform additional actions. However, if the receiving client device 110 determines 415 the information identifying the additional client device 110 included in the received request matches obtained information identifying a client device 110 authorized to transfer video data to the receiving client device 110, the receiving client device 110 obtains 420 information from the client device 110 to exchange video data with the other user. For example, the receiving client device 110 obtains 420 information identifying the other user or identifying a client device 110 associated with the other user with which the additional client device 110 was exchanging video data. However, the receiving client device 110 may obtain 420 any suitable information from the additional client device 110 to identify the other user with whom the additional client device 110 was exchanging video data.

Using the obtained information identifying the other user or identifying the client device 110 associated with the other user, the receiving client device 110 establishes 425 a connection with the online system 140 and provides information identifying the other user with whom the additional client device 110 was exchanging video data. In some embodiments, the receiving client device 110 obtains a session identifier assigned by the online system 140 to the exchange of video data with the other user from the additional client device 110, the receiving client device 110 provides the session identifier to the online system 140, which uses the session identifier to identify the other user and another client device 110 associated with the other user. Subsequently, the receiving client device 110 exchanges 425 video data with the other user by via the established connection with the online system 140. For example, video data provided by the other user is transmitted from the online system 140 to the receiving client device 110 via the established connection and presented by the display device 115 of the receiving client device 110. Similarly, video data captured by the image capture device 117 of the receiving client device 110 is transmitted to the online system 140 via the established channel, and the online system 140 transmits the video data to another client device 110 for presentation to the other user. In some embodiments, the user associated with the additional client device 110 provides a setting to the receiving client device 110 specifying whether video data captured by the additional client device 110 or video data captured by the image capture device 117 of the receiving client device 110 is transmitted from the receiving client device 110 to the online system 140. For example, a specific value for the setting causes the image capture device 117 of the receiving client device 110 to capture video data that is transmitted to the online system 140 via the established channel; however, an alternative value for the setting causes the receiving client device 110 to capture video data and to transmit the captured video data to the receiving client device 110, which transmits the video data to the online system 140 via the established channel. Hence, the user associated with the receiving client device 110 may specify whether the receiving client device 110 or the additional client device 110 obtains video data exchanged with the other user by the receiving client device 110. In other embodiments, the receiving client device 110 selects one of video data captured by the image capture device 117 of the receiving client device 110 or video data captured by the additional client device 110 based on any suitable criteria (e.g., video resolution, one or more settings maintained by the receiving client device 110 or by the additional client device 110) and transmits the selected video data to the online system 140 via the established channel.

As an example, the additional client device 110 has an established video call exchanging video data with another client device 110 via the online system 140. If the receiving client device 110 determines 415 information identifying the additional client device 110 included in the request received from the additional client device 110 matches obtained information identifying a client device 110 authorized to transfer video data to the receiving client device 110, as described above, the receiving client device 110 obtains 420 information from the additional client device 110 describing the video call. Subsequently, video data comprising the video call is received and presented by the receiving client device 110 and video data is transmitted by the receiving client device 110 to the online system 140 for communication to the other client device 110. In another example, the additional client device 110 is presenting content received from another client device 110 or from a third party system 130. If the receiving client device 110 determines 415 information identifying the additional client device 110 included in the request received from the additional client device 110 matches obtained information identifying a client device 110 authorized to transfer video data to the receiving client device 110, as described above, the receiving client device 110 obtains 420 information from the additional client device 110 describing presented content (e.g., information identifying a user to the other client device 110 or to the third party system 130, information identifying the content presented via the additional client device 110). Subsequently, the receiving client device 110 obtains the content from the other client device 110 or from the third party system 130 and presents the content instead of the additional client device 110. Hence, content obtained by the additional client device 110 from any suitable source (another client device 110, a third party system 130, the online system 140) presented or obtained by the additional client device 110 is subsequently obtained and presented by the receiving client device 110 if the receiving client device 110 determines 415 information identifying the additional client device 110 included in a request from the additional client device 110 matches obtained information identifying a client device 110 authorized to transfer video data to the receiving client device 110.

In some embodiments, the receiving client device 110 determines 415 whether the information identifying the additional client device 110 included in the received request matches obtained information identifying at least one client device 110 authorized to transfer video data, or other content, to the receiving client device 110 and determines whether video data of the local area captured by the image capture device 117 of the receiving client device 110 includes a user authorized to exchange video data with the receiving client device 110. As further described above, the receiving client device 110 or the online system 140 includes information identifying users who are authorized to exchange video data with the receiving client device 110. The receiving client device 110 or the online system 140 identifies a user in video data captured by the image capture device 117 of the receiving client device 110 and determines whether information identifying the identified user matches stored information identifying a user who is authorized to exchange video data with the receiving client device 110. In some embodiments, the receiving client device 110 obtains 420 information from the client device 110 to exchange video data with the other user in response to determining information identifying the additional client device 110 included in the received request matches obtained information identifying at least one client device 110 authorized to transfer video data and to determining the user identified in the video data captured by the image capture device 117 of the receiving client device 110 matches stored information identifying a user who is authorized to exchange video data with the receiving client device 110. If the user identified in the video data captured by the image capture device 117 of the receiving client device 110 does not match stored information identifying a user who is authorized to exchange video data with the receiving client device 110, the receiving client device does not obtain 420 information from the client device 110 to exchange video data with the other user, even if the information identifying the additional client device 110 matches at least one client device 110 authorized to transfer video data to the receiving client device 110 in some embodiments. The preceding embodiment allows the receiving client device 110 to restrict transferring video data from the additional client device 110 to the receiving client device 110 to situations where a user authorized to exchange video data with the receiving client device 110 is within the field of view of the image capture device 117 of the receiving client device 110 or is otherwise identified within a local area of the receiving client device 110 from image data, audio data, or other data captured by the receiving client device 110.

Additionally, the receiving client device 110 may combine exchanges of video data with the other user from multiple additional client devices 110. For example, the receiving client device 110 receives an additional request from an alternative client device 110 to transfer another exchange of video data with the user. As further described above, the receiving client device 110 determines 415 whether information identifying the alternative client device 110 included in the additional request matches stored information identifying at least one client device 110 authorized to transfer video data to the receiving client device 110. In response to the information identifying the alternative client device 110 matching stored information identifying at least one client device 110 authorized to transfer video data to the receiving client device 110, the receiving client device 110 obtains 420 information from the alternative client device to exchange the video data from the alternative client device with the other user, as further described above. In some embodiments, the receiving client device 110 maintains a threshold distance, and combines exchanges of video data from multiple additional client devices 110 having distances within the threshold distance of the receiving client device 110, as further described above. In the preceding embodiment, the receiving client device 110 does note combine an exchange of video data from an additional client device 110 greater than the threshold distance from the receiving client device 110.

The receiving client device 110 combines video data received from the additional client device 110 and from the alternative client device 110 and exchanges 425 the combined video data with the other user via the established channel between the receiving client device 110 and the online system 140. For example, the receiving client device 110 generates combined video data including video data received from the additional client device 110 presented in conjunction with video data received from the alternative client device 110; in one example, the combined video data includes video data received from the additional client device 110 in a region and video data received from the alternative client device 110 in another region. The receiving client device 110 may similarly generate combined video data including video data captured by the image capture device 117 in a region and video data received from the alternative client device 110 or from the additional client device 110 in another embodiment in some embodiments. As another example, the receiving client device 110 modifies one or more parameters of the image capture device 117 so the field of view of the image capture device 117 includes a user associated with the additional client device 110 and an additional user associated with the alternative client device 110. In some embodiments, the receiving client device 110 combines video data received from the additional client device 110 and from the alternative client device 110 with the additional client device 110 and the alternative client device 110 are within a threshold distance of the receiving client device 110. For example, the receiving client device 110 combines video data received from other client devices 110 within a threshold distance of the receiving client device 110.

In some embodiments, the receiving client device 110 receives an indication from the online system 140 that the user associated with the additional client device 110 is also exchanging video data with the other user via an alternative client device 110 other than the receiving client device 110 and the additional client device 110. Responsive to receiving the indication from the online system 140, the receiving client device 110 may obtain video data exchanged with the other user from the alternative client device 110 via the online system 140 or form the alternative client device 110 and modifies video data exchanged with the other user via the receiving client device 110. For example, the receiving client device 110 selects one of video data from the alternative client device 110, video data from the additional client device 110, or video data captured by the image capture device 117 of the receiving client device 110 based on any suitable criteria. The receiving client device 110 subsequently exchanges 425 the selected video data with the other user via the established channel between the receiving client device 110 and the online system 140. As another example, the online system 140 modifies video data captured by the image capture device 117 of the receiving client device 110 and exchanges 425 the modified video data with the other user via the established channel between the receiving client device 110 and the online system 140. Example modifications to the video data include augmenting the video data with overlaid image or text data indicating the video data is associated with a user who is exchanging video data via multiple client devices 110, changing a color or a shading of the video data captured by the image capture device 117, or any other modification that alters visual perception of the video data captured by the image capture device 117.

In some embodiments, the receiving client device 110 transfers the exchange of video data with the other user to an alternative receiving client device 110 if the user associated with the client device 110 is no longer identified in video data captured by the image capture device 117 of the receiving client device 110 or is no longer identified as being within a local area surrounding the receiving client device 110. For example, the receiving client device 110 transmits a message to the online system 140 in response to determining video data captured by the image capture device 117 does not include the user associated with the additional client device 110 or in response to determining the user associated with the additional client device 110 is no longer within a local area surrounding the receiving client device 110. Upon receiving the message, the online system 140 identifies other receiving client devices 110 from a user profile maintained by the online system 140 for the user associated with the receiving client device 110 and obtains video data captured by imaging devices 117 of the other receiving client devices 110 or other data (e.g., audio data) captured by the other receiving client devices 110. In response to determining video data captured by an imaging device of an alternative receiving client device 110 of the other receiving devices 110 includes the user associated with the additional client device 110 or to determining other data captured by the alternative receiving client device 110 indicates the user associated with the additional client device 110 is within a local area surrounding the alternative receiving client device 110 (e.g., audio data captured by the alternative receiving client device 110 matches audio data identifying the user associated with the additional client device 110), the online system 140 transmits information to exchange video data with the other user from the receiving client device 110 to the alternative receiving client device 110. Subsequently, the alternative receiving client device 110, rather than the receiving client device 110, exchanges the video data with the other user. This allows different receiving client devices 110 to exchange video data with the other user as the user associated with the additional client device 110 changes locations without the user associated with the additional client device 110 manually transferring the exchange of video data to different receiving client devices 110.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    at a receiving client device associated with a user of an online system and including an image capture device capturing video data of a local area within a field of view of the image capture device:
        obtaining information identifying one or more other client devices authorized to transfer video data to the receiving client device;
        receiving a request from an additional client device associated with the user to transfer an established exchange of video data captured by the image capture device of the additional client device and other video data captured by a client device of another user of the online system from the additional client device to the receiving client device, the request including information identifying the additional client device;
        determining the user of the online system is included in video data captured by the image capture device of the receiving client device based on stored biometric data identifying the user of the online system;
        determining biometric information identifying the user of the online system matches stored information identifying at least one user authorized to exchange video data with the receiving client device;
        responsive to determining the received information identifying the additional client device included in the request matches obtained information identifying a client device authorized to transfer video data with the receiving client device and to determining biometric information identifying the user of the online system matches stored information identifying at least one user authorized to exchange video data with the receiving client device, obtaining information from the additional client device to exchange video data with the other user;
        establishing a connection between the online system and the receiving client device based on the obtained information from the additional client device; and
        exchanging video data with the other user via the receiving client device and the established connection instead of via the additional client device.

2. The method of claim 1, wherein information identifying one or more client devices authorized to transfer video data to the receiving client device comprises device identifiers associated with each of the one or more other client devices authorized to transfer video data to the receiving client device.

3. The method of claim 1, wherein obtaining, at the receiving client device, information identifying one or more other client devices authorized to transfer video data to the receiving client device comprises:
    capturing video data of the local area within the field of view of the image capture device of the receiving client device;
    identifying the user included in the captured video data;
    transmitting information identifying the user to the online system; and
    receiving the information identifying one or more other client devices authorized to transfer video data to the receiving client device from the online system.

4. The method of claim 1, wherein obtaining, at the receiving client device, information identifying one or more other client devices authorized to transfer video data to the receiving client device comprises:
    capturing video data of the local area within the field of view of the image capture device of the receiving client device;
    identifying a user included in the captured video data; and
    retrieving information stored by the receiving client device in association with the user identifying the one or more other client devices authorized to transfer video data to the receiving client device.

5. The method of claim 1, further comprising:
    receiving, at the receiving client device, an additional request from an alternative client device associated with an alternative user of the online system user to transfer an exchange of video data with the user of the online system, the additional request including information identifying the alternative client device;
    responsive to determining the received information identifying the alternative client device included in the request matches obtained information identifying at least one client device authorized to transfer video data with the receiving client device, obtaining information from the alternative client device to exchange the video data from the alternative client device with the other user;
    combining video data received by the receiving client device from the alternative client device and from the additional client device; and
    exchanging the combined video data received from the alternative client device and from the additional client device with the other user via the receiving client device and the established connection.

6. The method of claim 5, wherein the combined video data includes video data received from the alternative client device presented in conjunction with video data received from the additional client device.

7. The method of claim 1, further comprising:
    receiving, at the receiving client device, an indication that the user associated with the additional client device is exchanging video data with the other user from an alternative client device other than the receiving client device and the additional client device;

obtaining, at the receiving client device, video data exchanged with the other user from the alternative client device;

selecting one of video data captured by the receiving client device, video data received from the additional client device, and video data received from the alternative client device; and exchanging the selected video data with the other user via the receiving client device and the established connection.

8. The method of claim 7, wherein selecting one of video data captured by the receiving client device, video data received from the additional client device, and video data received from the alternative client device comprises:

modifying video data captured by the receiving client device.

9. The method of claim 1, wherein exchanging video data with the other user via the receiving client device and the established connection comprises:

selecting one of video data captured by the receiving client device and video data received from the additional client device; and exchanging the selected video data with the other user via the receiving client device and the established connection.

10. A computer program product comprising a computer readable storage medium having instructions encoded thereon that, when executed by a processor, cause the processor to:

at a receiving client device associated with a user of an online system and including an image capture device capturing video data of a local area within a field of view of the image capture device:

obtain information identifying one or more other client devices authorized to transfer video data to the receiving client device;

receive a request from an additional client device associated with the user to transfer an established exchange of video data captured by the image capture device of the additional client device and other video data captured by a client device of another user of the online system from the additional client device to the receiving client device, the request including information identifying the additional client device;

determining the user of the online system is included in video data captured by the image capture device of the receiving client device based on stored biometric data identifying the user of the online system;

determining biometric information identifying the user of the online system matches stored information identifying at least one user authorized to exchange video data with the receiving client device;

responsive to determining the received information identifying the additional client device included in the request matches obtained information identifying a client device authorized to transfer video data with the receiving client device and to determining biometric information identifying the user of the online system matches stored information identifying at least one user authorized to exchange video data with the receiving client device, obtain information from the additional client device to exchange video data with the other user;

establish a connection between the online system and the receiving client device based on the obtained information from the additional client device; and exchange video data with the other user via the receiving client device and the established connection instead of via the additional client device.

11. The computer program product of claim 10, wherein information identifying one or more client devices authorized to transfer video data to the receiving client device comprises device identifiers associated with each of the one or more other client devices authorized to transfer video data to the receiving client device.

12. The computer program product of claim 10, wherein obtain, at the receiving client device, information identifying one or more other client devices authorized to transfer video data to the receiving client device comprises:

capture video data of the local area within the field of view of the image capture device of the receiving client device;

identify the user included in the captured video data;

transmit information identifying the user to the online system; and receive the information identifying one or more other client devices authorized to transfer video data to the receiving client device from the online system.

13. The computer program product of claim 10, wherein obtain, at the receiving client device, information identifying one or more other client devices authorized to transfer video data to the receiving client device comprises:

capture video data of the local area within the field of view of the image capture device of the receiving client device;

identify the user included in the captured video data; and retrieve information stored by the receiving client device in association with the user identifying the one or more other client devices authorized to transfer video data to the receiving client device.

14. The computer program product of claim 10, wherein the computer readable storage medium further has instructions encoded thereon that, when executed by the processor, cause the processor to:

receive, at the receiving client device, an additional request from an alternative client device associated with an alternative user of the online system user to transfer an exchange of video data with the user of the online system, the additional request including information identifying the alternative client device;

responsive to determining the received information identifying the alternative client device included in the request matches obtained information identifying at least one client device authorized to transfer video data with the receiving client device, obtain information from the alternative client device to exchange the video data from the alternative client device with the other user;

combine video data received by the receiving client device from the alternative client device and from the additional client device; and exchange the combined video data received from the alternative client device and from the additional client device with the other user via the receiving client device and the established connection.

15. The computer program product of claim 14, wherein the combined video data includes video data received from the alternative client device presented in conjunction with video data received from the additional client device.

16. The computer program product of claim 10, wherein the computer readable storage medium further has instructions encoded thereon that, when executed by the processor, cause the processor to:

receive, at the receiving client device, an indication that the user associated with the additional client device is exchanging video data with the other user from an alternative client device other than the receiving client device and the additional client device;

obtain, at the receiving client device, video data exchanged with the other user from the alternative client device;

select one of video data captured by the receiving client device, video data received from the additional client device, and video data received from the alternative client device; and exchange the selected video data with the other user via the receiving client device and the established connection.

17. The computer program product of claim 16, wherein select one of video data captured by the receiving client device, video data received from the additional client device, and video data received from the alternative client device comprises:

modify video data captured by the receiving client device.

18. The computer program product of claim 10, wherein exchange video data with the other user via the receiving client device and the established connection comprises:

select one of video data captured by the receiving client device and video data received from the additional client device; and exchange the selected video data with the other user via the receiving client device and the established connection.

* * * * *